United States Patent [19]
Jircitano et al.

[11] Patent Number: 5,339,684
[45] Date of Patent: Aug. 23, 1994

[54] GRAVITY AIDED INERTIAL NAVIGATION SYSTEM

[75] Inventors: Albert Jircitano, Grand Island; Daniel E. Dosch, Hamburg, both of N.Y.

[73] Assignee: Textron Inc., Providence, R.I.

[21] Appl. No.: 805,544

[22] Filed: Dec. 10, 1991

[51] Int. Cl.$^5$ .................... G01C 21/20; G01C 21/24; G06G 7/78
[52] U.S. Cl. ................... 73/178 R; 364/453; 364/454
[58] Field of Search .............. 73/178 R; 364/453, 454

[56] References Cited

U.S. PATENT DOCUMENTS

| | | | |
|---|---|---|---|
| 3,545,266 | 12/1970 | Wilson | 73/178 R X |
| 3,610,900 | 10/1971 | Talwani | 364/453 X |
| 3,633,003 | 1/1972 | Talwani | 364/453 X |
| 3,769,710 | 11/1973 | Reister | 33/320 |
| 4,085,440 | 4/1978 | Hose | 364/454 |
| 4,173,784 | 11/1979 | Heath et al. | 364/453 |
| 4,882,697 | 11/1989 | Ross | 364/454 |

OTHER PUBLICATIONS

Hildebrant et al, "The Effects of Gravitational Uncertainties on the Errors of Inertial Navigation Systems"; Navigation, (vol. 21, No. 4; Winter 1974–75; pp. 357–363).

Primary Examiner—Bernarr E. Gregory
Attorney, Agent, or Firm—Bean, Kauffman & Spencer

[57] ABSTRACT

An autonomous covert Inertial Navigation System uniquely suited for underwater applications wherein Schuler and siderial errors are bounded without external navigation aids or active instrumentation of ground speed is achieved by integrating a conventional Inertial Navigation System with a gravity gradiometer capable of measuring gravity field components independently of platform accelerations.

10 Claims, 5 Drawing Sheets

FIG. 1

$$A_G = A_1 + A_2 - A_3 - A_4 = 4R\left[\frac{T_{xx}-T_{yy}}{2}\sin 2\Omega t + T_{xy}\cos 2\Omega t\right]$$

GRAVITY AIDED INERTIAL NAVIGATION SYSTEM

FIELD OF THE INVENTION

This invention relates to inertial navigational systems. More specifically, it relates to a new integration of a conventional three axis Inertial Navigation System (INS) with gravity gradiometer instrument(s) and a height or depth sensor.

BACKGROUND OF THE INVENTION

Inertial navigation systems employ a triad of accelerometers in combination with a triad of angular rate sensors for providing velocity and position information to a navigational computer. Such systems provide continuous measures of vertical acceleration, (perpendicular to the earth's surface) and horizontal acceleration, (parallel to the earth's surface) and can determine vertical and horizontal velocity as well as vertical position and horizontal position by time integration of the vertical and horizontal acceleration.

Simple integration of vertical and horizontal acceleration to provide vertical and horizontal velocity, and integration of the velocities to provide vertical and horizontal position results in unbounded errors in the resultant vertical and horizontal axis information due to two causes. First, INS accelerometers measure the desired vehicle acceleration but in combination with the gravity field. Although the normal component of the gravity field can be accounted for, the anomalous component cannot. Consequently, this acceleration together with accelerometer and gyro instrument errors lead to navigation errors at Schuler and siderial frequencies which grow unbounded with time. Second, any vertical position error results in an error in the computer derived normal gravity component which causes the vertical position error in the INS to increase without bound.

A gravity gradiometer measures the gravity field independently of vehicle acceleration so it can be used to correct INS accelerometer outputs for the anomalous gravity field component. The unstable INS vertical channel is often remedied in practice by integrating a height sensor (depth gauge, altimeter, or surface ship sea level knowledge). The difference between inertial vertical position and that of the height sensor is used to stabilize the inherently unstable vertical channel.

The resulting navigation performance, although much improved over that of the conventional unaided INS, continues to exhibit growing errors at schuler and siderial frequencies due to INS instrument (including gravity gradiometer) errors.

If a gravity field map is available the integrated INS (conventional INS+gravity gradiometer sensor(s)- +depth sensor) can implement a map matching mode. In this scheme mapped values of gravity field anomaly are compared with measured values in a filter to bound velocity and position errors.

Apart from the requirement for a gravity map, navigation performance is somewhat compromised because the core INS around which map matching navigation is implemented has unbounded velocity and position errors so in weak gravity signature regions navigation errors will tend to grow.

Although the prior art which integrates a conventional 3 axis INS with gravity gradiometer(s), and a height sensor greatly improves navigation performance in both the INS (no gravity map) and in the map matching mode, it does not fully utilize overall navigations system velocity error observability. If this velocity error observability is exploited these errors can be bounded even in the INS mode. The resulting improvement in the core INS mode, where now only east position error is unbounded, leads to improved map matching performance.

OBJECTIVES OF THE INVENTION

A primary objective of the invention is to provide an autonomous covert Inertial Navigation System (INS) wherein inertial velocity errors are bounded without external navigation aids or active instrumentation of ground speed.

An objective of the invention is to provide accurate, self-contained, passive navigation with bounded velocity error and improved position error (bounded Schuler and siderial components) by integrating gradiometer and height (depth) sensors with conventional inertial navigation instruments.

A further objective of this invention is an integration scheme which takes advantage of navigation system velocity error observability wherein east velocity error through the mechanism of vertical Coriolis acceleration, is manifested in observable height (depth) error.

A still further objective of this invention is an integration scheme wherein gravity disturbance vector estimates, based mainly on gradiometer measurements, are used to compensate inertial navigation system accelerometer measurements.

A further objective of this invention is an integration scheme which takes advantage of navigation system velocity error observability wherein erroneous velocity estimates used to propagate gravity states cause gravity state errors which are manifested in observable height error and gradiometer innovation errors.

A still further objective of this invention is an integration scheme resulting in a core INS system with all velocity and position errors bounded except east position which may be controlled by a star tracking or by a map matching mode.

SUMMARY

Integration of gravity gradiometer sensor(s) and height (depth) sensor with a conventional inertial navigation system (INS) results in a new INS termed the Gravity Aided Inertial Navigation System (GAINS). Like the conventional INS, GAINS is autonomous and covert but additionally has bounded velocity error resulting in bounded Schuler and sidereal errors. Gradiometer(s) and height sensor measurements differenced with predicted values are processed by the system to obtain estimates of the anomalous gravity field, navigation errors, and instrument errors.

One open loop and three closed loop mechanisms are used to control velocity error. First, real time estimation of the gravity field includes disturbance vector estimates which are used to open loop compensate the INS accelerometers so that navigation errors are not driven by the disturbance vector. Second, subtracting gravity field estimates from accelerometer measurements results in estimated vehicle accelerations consisting of true vehicle acceleration components and velocity dependent Coriolis terms. After using INS estimates of velocity to compensate for Coriolis effects, acceleration estimates are integrated into vertical and horizontal estimates of velocity and position. The vertical position estimates are differenced with height sensor measurements to obtain an observation of vertical channel estimation errors. Since East velocity error leads to Coriolis compensation error in the vertical channel, it becomes observable by the optimal filter. This is one of three closed loop mechanisms for controlling velocity error.

The second and third closed loop mechanisms for velocity control are as follows. The gravity field estimates are propagated forward at seconds using the current best estimate of velocity. The linearized relationship of gravity disturbance error to velocity error is given by the product of $\Delta t$ and the estimated gradients. Since the vertical component of gravity disturbance is used to compensate the vertical accelerometer, this velocity dependent error is observable in the height error signal. The difference between predicted and measured gradients are likewise attributable to velocity and gravity field estimation error. In this case the linearized relationship to velocity error is the product of at with the third order gravity field estimates.

Thus GAINS, in the pure INS mode (no gravity map) provides bounded velocity error and hence, bounded schuler and siderial errors. In this mode only east position error is unbounded. In order to bound east position error as well, a star tracker can be used or if a gravity map is available, a map matching outer loop can be implemented.

The Gravity Aided Inertial Navigation System is: self-contained (no external signals required); covert (no signal emanated; near surface operation not required).; unrestricted in operating area; able to operate in quiet or active gravity regions; and able to be configured with proven instruments.

The instrument which enables this type of operation is the gravity gradiometer instrument, developed by Bell Aerospace Textron for the Unisys Corporation and the Strategic Systems Program Office (SSPO). This instrument and gravity meter assemblies were incorporated in the Trident 11 Gravity Sensors System (GSS).

DETAILED DESCRIPTION OF INVENTION

To clearly present the concept on which the invention is based, gravity field nomenclature and definitions are standardized in the following specification. In all the descriptions that follow a carat ( ˆ ) is used to denote the best estimate of some system parameter (i.e. $V_N$ means best estimate of North Velocity). A tilde ( ~ ) is used to denote the error in that estimate. Throughout the specification and claims, a height sensor is synonymous with depth sensor and both are vertical displacement sensors.

GRAVITY FIELD NOMENCLATURE AND DEFINITIONS

Gravitation is a potential field defined by a scalar potential wherein the anomalous component of the field is given by;

$$T = W - U$$

where:
W = total gravitation potential
U = regular potential associated with an idealized regular earth Spacially differentiating the anomalous potential with respect to north, east, down (NED) coordinates results in the anomalous disturbance vector designated $T_i$ $$\underline{T}_i = (T_N T_E T_D)^{1} = \left[ \frac{\partial T}{\partial N} \quad \frac{\partial T}{\partial E} \quad \frac{\partial T}{\partial D} \right]^{1}$$

$^{1}$ denoted transpose.

A single axis accelerometer measures one component of the specific acceleration given by;

$$\underline{A} = \left[ \frac{\partial^2 \underline{R}}{\partial t^2} \right]_{\underline{I}} - \underline{w}_i = \left[ \frac{\partial^2 \underline{\overline{R}}}{\partial t^2} \right]_{\underline{I}} - \underline{U}_i - \underline{T}_i$$

Differentiating the disturbance vector spatially results in the anomalous gravity gradient second order tensor designated $T_{ij}$ $$T_{ij} = \begin{bmatrix} T_{NN} & T_{NE} & T_{ND} \\ T_{EN} & T_{EE} & T_{ED} \\ T_{DN} & T_{DE} & T_{DD} \end{bmatrix} =$$

$$\begin{bmatrix} \frac{\partial^2 T}{\partial N^2} & \frac{\partial^2 T}{\partial N \partial E} & \frac{\partial^2 T}{\partial N \partial D} \\ \frac{\partial^2 T}{\partial E \partial N} & \frac{\partial^2 T}{\partial E^2} & \frac{\partial^2 T}{\partial E \partial D} \\ \frac{\partial^2 T}{\partial D \partial N} & \frac{\partial^2 T}{\partial D \partial E} & \frac{\partial^2 T}{\partial D^2} \end{bmatrix}$$

This tensor is symmetric since the order of differentiation does not affect the result. Since Laplace's constraint applies, the tensor has five independent elements. A gradiometer measures components of $W_{ij} = (U_{ij} + T_{ij})$.

Continued spatial differentiation is used to compute the higher order anomalous gravity tensor terms if they are required. The third order term $T_{ijk}$ for example, is used in gravity gradiometer map matching.

ROTATING GRAVITY GRADIOMETER

Figure 1:
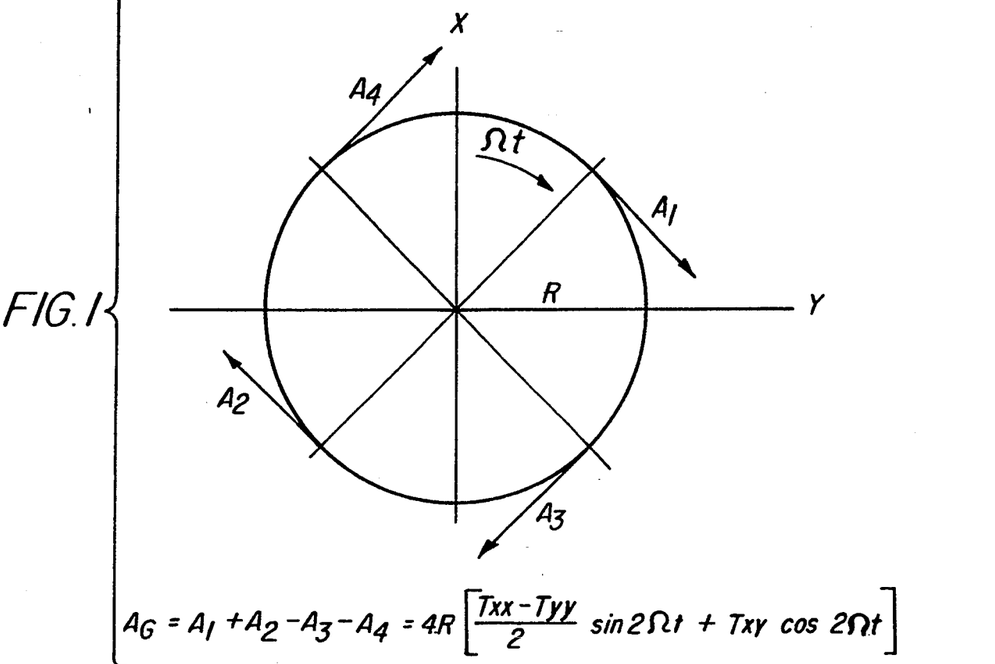
FIG. 1 is a conceptual drawing of the rotating gravity gradiometer instrument.

FIG. 1 depicts as by way of example the Bell Aerospace rotating gravity gradiometer instrument (GGI) which consists of four single axis accelerometers ($A_1$, $A_2$, $A_3$ and $A_4$) mounted tangentially at cardinal points on a rotating instrument block or wheel. Two outputs of the GGI are obtained by demodulating the signal $$A_G = A_1 + A_2 - A_3 - A_4$$

at sin 2Ωt and cos 2Ωt where Ω is the wheel rotation rate ($\approx \frac{1}{4}$ Hz). Note that if the accelerometers are perfectly aligned, scale factor balanced, and linear, no wheel acceleration or angular acceleration about its spin axis appear in $A_G$. In addition any residual linear acceleration sensitivity will be modulated at Ω and, therefore, will not appear in the 2Ω demodulation outputs. So the gradiometer which is mounted on a stabilized platform is insensitive to vehicle acceleration to first order. The instrument measures the components of the gradient lying in the plane of the wheel. The gravity field at any point in be plane of the wheel is given by the Taylor series expansion about the wheel center.

$$T_i(d) = (T_i)_0 + (T_{ij})_0 d_j + \frac{1}{2!} [T_{ijk}]_0 d_k d_j + \dots$$

The output of accelerometer $A_1$ is $$A_1 = [\overline{A}_0 - T_{ij}(R_j)] \cdot \overline{1}_1$$

where $R_j$—radius vector to $A1$
where $A_o$—acceleration of the wheel center.
and $1_1$, is a unit vector defining the sensitive axis of $A_1$.
To first order $$A_1 = \left[ A_0 - (T_i)_0 - \begin{bmatrix} T_{xx} T_{xy} \\ T_{xy} T_{yy} \end{bmatrix} \begin{bmatrix} R\cos\Omega t \\ R\sin\Omega t \end{bmatrix} \right] \cdot \begin{bmatrix} -\sin\Omega t \\ \cos\Omega t \end{bmatrix}$$

Since $A_G = A_1 + A_2 - A_3 - A_4$, the first two terms in (11) will cancel while the third term will add yielding.

$$AG = 4R \begin{bmatrix} T_{xx}\cos\Omega t & T_{xy}\sin\Omega t \\ T_{xy}\cos\Omega t & T_{yy}\sin\Omega t \end{bmatrix} \cdot \begin{bmatrix} -\sin\Omega t \\ \cos\Omega t \end{bmatrix} \text{or}$$

$$AG = 4R \left[ \frac{T_{xx} - T_{yy}}{2} \sin 2\Omega t + T_{xy}\cos 2\Omega \right]$$

Sin 2Ω and cos 2Ωt demodulation of $A_G$ and low pass filtering produces the inline and cross outputs $2R(T_{xx}-T_{xy})$ and $4RT_{xy}$ respectively.

Figure 2:
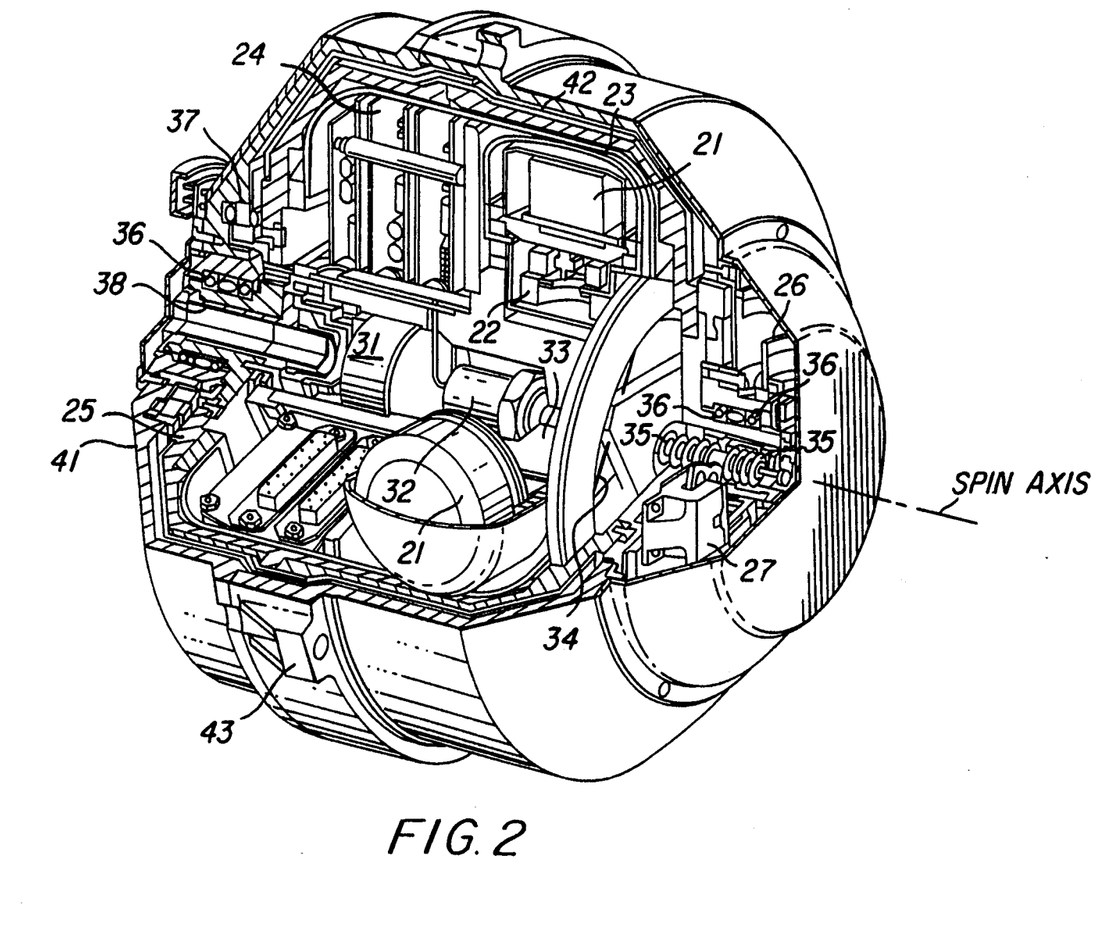
FIG. 2 is a cut-away drawing illustrating the physical orientation of the major elements of the gravity gradiometer instrument (GGI).

FIG. 2 illustrates the major components which comprise the gravity gradiometer instrument or GGI. The system includes four accelerometers positioned at 90° increments tangentially around a rotatable accelerometer support mounting block 33. A shake actuator 31 and shake PO accelerometer 32 are positioned along the spin axis of the mounting block 33 which is supported by axial shake flexures 34 and an axial shake adjustment spring 35.

Each of the four accelerometers 21 is contained within its own magnetic shield housing 23 along with its accelerometer preamplifier 22. Additional electronics are located on printed circuit boards 24 which are mounted to the accelerometer mounting block 33.

The accelerometers 21 and 32, shake actuator 31 and printed circuit boards 24 are contained within a magnetic shielding housing 25 which is supported for rotation about the spin axis along with the accelerometers and other components mounted on the rotatable accelerometer mounting block contained therein. The rotating housing is supported by ball bearings 36 and driven by a motor 37 which spins the rotatable housing and the rotatable support mounting block contained therein within the relatively stationary housing 41 which includes a further magnetic shield 42. Slip rings 38 provide electrical connections required to drive the rotating elements and power the subsystems and extract the data. Rotational speed is controlled via a shaft encoded disk 26 and encoder pickoff 27.

Figure 4:
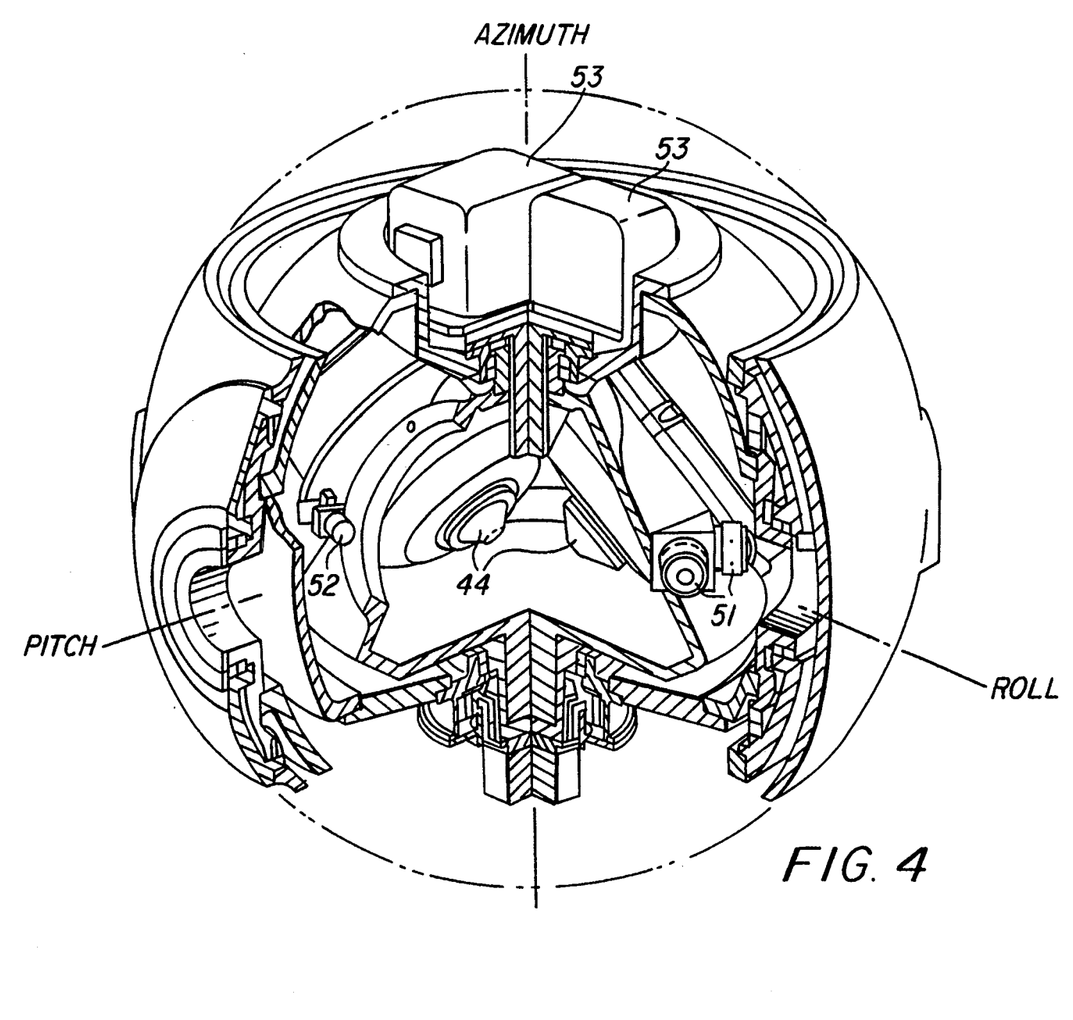
FIG. 4 is a cut-away drawing illustrating the positioning of the GGIs within an inertial platform.

The gravity gradiometer instrument component housing 41 includes a mounting plate 43. The mounting plate is used to firmly secure the gravity gradiometer instrument within the inertial platform as illustrated in FIG. 4 wherein two of the three gravity gradiometer instruments 44 are depicted.

Since the gradient tensor has five independent components and a single GGI measures two linear combinations in the wheel plane, it follows that if the complete tensor is to be measured, three GGIs are required.

Figure 3:
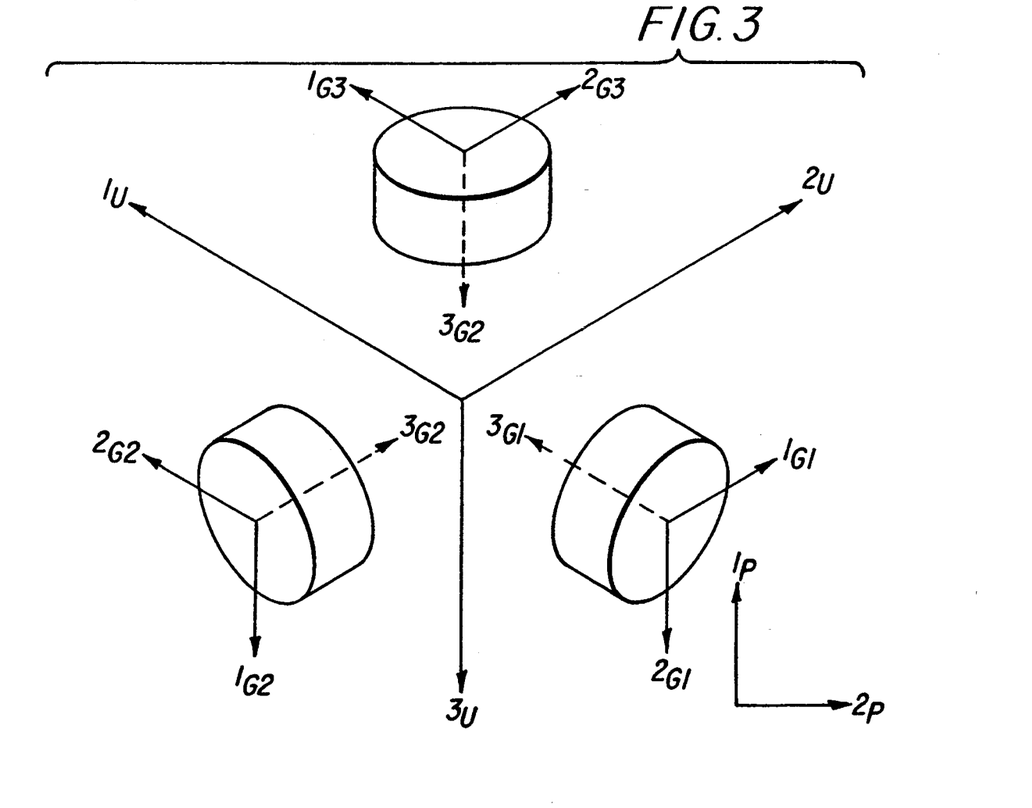
FIG. 3 is a schematic illustrating the umbrella orientation of three GGIs where each spin axis has the same orientation with respect to the local gravity vector.

The three GGIs are relatively arranged in an umbrella orientation as illustrated in FIG. 3 where each spin axis has the same orientation with respect to the local gravity vector. Two of the GGIs 44 are visible through the cutaway illustration of the platform in FIG. 4. Note that this cutaway also indicates the pitch, azimuth and roll axis of the platform relative to the GGIs and the positioning of the gyros 51, horizontal platform accelerometers 52 and gradiometer (vertical accelerometer) 53.

It is not necessary in all applications to instrument the complete tensor. For instance, a parametric study may be accomplished for the performance of a single, double or triple GGI configuration. In any event, the entire stabilized platform which carries the INS sensors as well as the gravity sensors is carouselled about local vertical at 500°/hr. Consequently, a vehicle moving slowly through a slowly changing field with a single gradiometer at the umbrella angle will in time measure the full gradient.

GAINS SYSTEM CONCEPT

Figure 5:
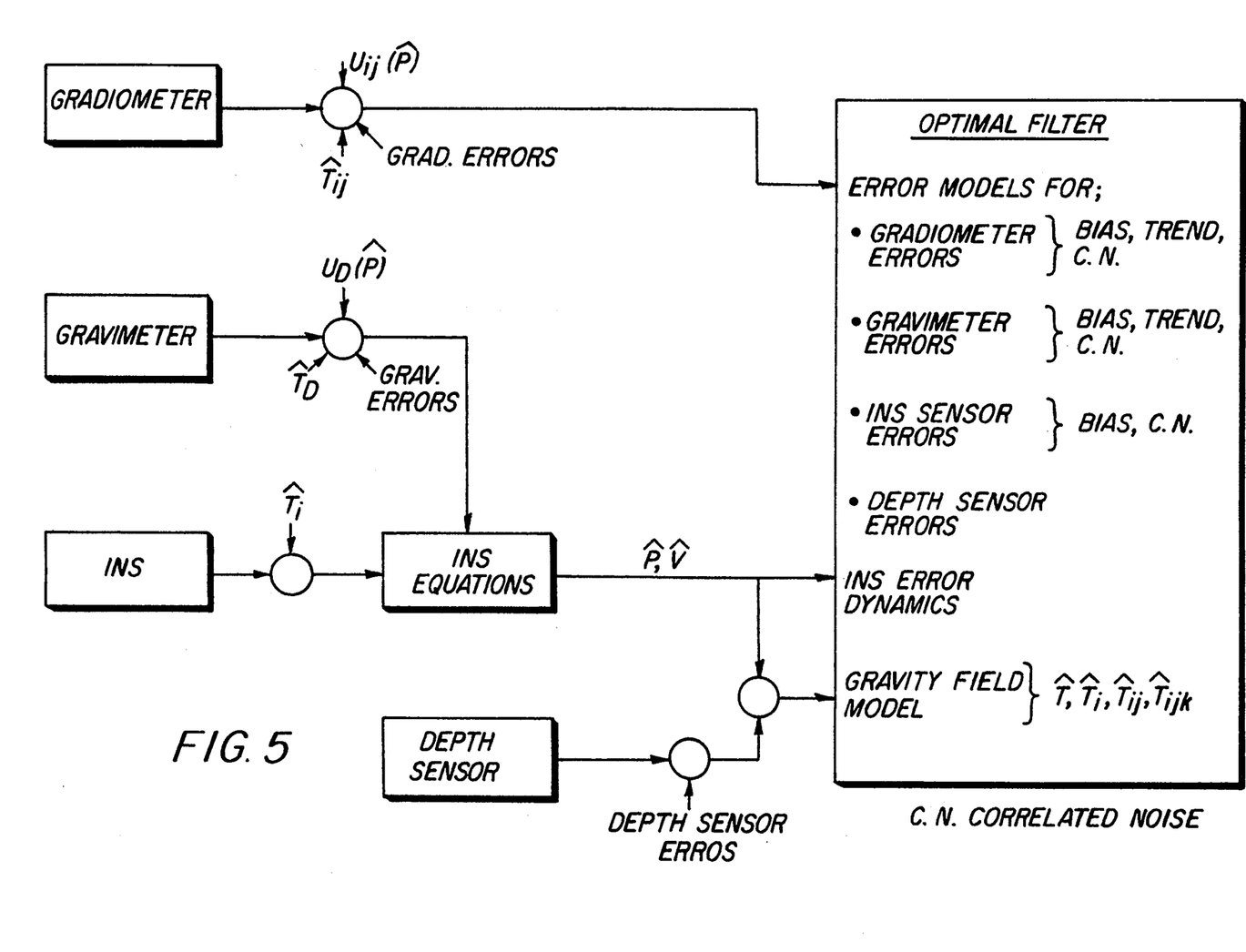
FIG. 5 is a block diagram of a basic Gravity Aided Inertial Navigation System.

FIG. 5 is a block diagram of a GAINS implementation. It has been greatly simplified to clarify the essential features of the concept. The system consists of a gradiometer, a three axis inertial navigation system (INS), a height sensor, and an optimal filter whose function is to integrate the subsystems to produce the best possible navigation (i.e. provide the best estimates of INS position and velocity errors, gravity field, and instrumentation parameters). Simply put, the invention is based on the observation that over time, almost all system errors that impact inertial navigation accuracy manifest themselves in the vertical channel of the navigator. If an independent measure of vertical navigation is available, it can be compared with the INS vertical channel and the difference processed to provide better estimates of the system errors. Different INS configurations (e.g. local-level, space stabilized, strap down) lead to different characterizations of system dynamics. A model of these dynamics is required in applying this invention to a specific configuration. Also open to choice is the type of filter used to process measurements (e.g. Kalman fitter, non-linear estimator, least squares estimator). The crucial element is knowledge of how overall system errors manifest themselves in the measurements.

FIG. 5 shows the vertical accelerometer of the INS separately to emphasize how instrument corrections are dependent on estimated position and velocity.

Included in the optimal filter is a mechanization of the dynamics of the INS including standard siderial loop, Schuler and vertical channel mechanisms. In this way the propagation of system errors in the navigation channels can be tracked. Of special interest is the dependence of both Coriolis compensation error and vertical gravity estimation error on velocity error. These errors propagate into vertical position error and thus a comparison of INS vertical position with height sensor measurements allows estimation of these INS velocity errors and all other system errors that lead to velocity errors.

The dependence of gravity estimation error on navigator velocity error is implicit in any mechanization of gravity estimation that includes gradiometers. The following is an example of this dependence using a specific statistical representation of the anomalous gravity field and its modeling as a markov process appropriate for state space implementation.

A STATISTICAL MODEL OF THE ANOMALOUS GRAVITY FIELD

A number of different statistical characterizations of the gravity field have been developed. The Sperry Three Dimensional Analytic Gravity Model (STAG) is presented as exemplary. The STAG gravity potential autcorrelation function is defined as:

$$C_{TT}(r) = \sum_{n=1}^{N} C_{TTn}(r) = \sum_{n=1}^{N} \frac{\sigma_T^2 a_n}{[1 + (r/d_n)^2]^{\frac{1}{2}}}$$

Each of the n terms covers a different range of spatial frequencies. Empirical fits ($\sigma_T$, $a_n$, $d_n$) to ocean survey data have been computed using typically N=3 or more terms. Statistical characterization of higher order tensor terms and cross correlations are computed by spatially differentiating this equation.

The cross correlations between the N gravity processes are assumed to be zero. The gravity field at a point can then be characterized by the sum of N gravity processes $G_n$ where $$G_n = \begin{bmatrix} T \\ \hline T_i \\ \hline T_{ij} \\ \hline \vdots \end{bmatrix}_n$$

EXAMPLE MARKOV MODELING OF THE GRAVITY FIELD

The STAG model of the gravity field is not Markov and, therefore, not suitable for incorporation into a state space Kalman filter. If implementation of such a filter is desired, a recursive model with statistics approximating those of the STAG model is required. In particular, a transition matrix $\Phi_n$ and a plant noise matrix $Q_n$ are needed to characterize the process noise for each $G_n$ process. For a given change in position, $\vec{Y}$, we can approximate the optimal transition matrix $\Phi_n$ by $$\Phi_n(\vec{Y}) = C_n(0.465\vec{d}_n + \vec{Y})C_n^{-1}(0.465\vec{d}_n) \qquad \text{Eq. 1}$$

where $\vec{d}_n$ has the same direction as $\vec{Y}$ and magnitude equal to the STAG parameter $d_n$. In order for the statistics of the process to remain stationary the $Q_n$ matrix must have the form $$Q_n = C_n(0) - \Phi_n(\vec{Y})C_n(0)\Phi'_n(\vec{Y})$$

This $Q_n$ is associated with plant white noise driving only the highest order tensor terms in $G_n$. This formulation has been found to give a markov gravity model having good statistical agreement with the STAG model.

EFFECT OF VELOCITY ERROR ON THE FILTER TRANSITION MATRIX

The matrix $\Phi_n$, determined above is correct only if the true change in position, $\vec{Y}$, is precisely known ($\vec{Y} = \vec{V}\Delta t$ where $\Delta t$ = iteration interval). In fact, this vector will be in error by $\vec{V}\Delta t$. Hence, the proper transition matrix must include the propagation of velocity errors into gravity errors. In the transition matrix given in Eq. 1, gravity estimation errors would appear to be the result of previous gravity errors and driving noise only. In a transition matrix that accurately reflects the effects of velocity error, three more columns of $\Phi_n$, need to be computed, namely those multiplying the three navigation velocity error states. In essence these error propagation terms come from integration of the gradients over an incorrect vector position change. In general $$[G_n]_K = \left[ \Phi_n(\vec{\gamma}) \; \frac{\partial \Phi(\vec{\gamma})}{\partial(V_N \Delta t)} (G_n)_{K-1}\Delta t \; \frac{\partial \Phi(\vec{\gamma})}{\partial(V_E \Delta t)} (G_n)_{K-1}\Delta t \; \frac{\partial \Phi(\vec{\gamma})}{\partial(V_D \Delta t)} (G_n)_{K-1}\Delta t \right] \begin{bmatrix} (G_n)_{K-1} \\ \vec{V}_N \Delta t \\ \vec{V}_E \Delta t \\ \vec{V}_D \Delta t \end{bmatrix} \qquad \text{Equation (2)}$$

For the given markov model, Eq. 2 is the required formulation of gravity estimation transition reflecting the dependence upon velocity error.

EXAMPLE FILTER IMPLEMENTATION (KALMAN FILTER)

One possible implementation of this invention uses a Kalman filter as the parameter estimation routine. Combining the state space modeling of the gravity field transition given above with standard INS state space models gives the system formulation required by the Kalman fitter. In this implementation, INS accelerometers are compensated for Coriolis effects (using navigator velocity estimates), normal gravity (using navigator position estimates), anomalous gravity (using filter gravity estimates), and instrumentation errors (using filter estimates), and these accelerations are processed to give inertial velocity and position estimates. The state vector (estimates of gravity field and system parameters) and state uncertainty matrix are transitioned in the standard fashion to the new time and place as estimated by the INS navigator. A measurement vector is then formed. The first measurement is the difference between the INS estimate of vertical position and the estimate from the height sensor. The other measurements are the gradiometer outputs. It is important to note that the gradiometer need not measure the complete gravity tensor for the GAINS concept to be effective.

The standard Kalman gain matrix is then calculated. The gains are applied to the difference between the measurement vector and the predicted measurements. The results are used to improve the system estimates, and the state uncertainty matrix is updated as is standard in a Kalman filter. This procedure is repeated at a rate mostly dictated by the speed of the computer hardware chosen for a given system.

When this system reaches steady state, all navigator errors will be bounded except for east position errors of near zero frequency (non-sidereal, non Schuler errors associated with polar axis drift in inertial coordinates)

Thus a method of inertial navigation is effected where the velocity error and position error are bounded at Schuler and sidereal frequencies without external navigation aids or active instrumentation of ground speed by optimally integrating available measurements. For instance, bounding the velocity error and position error may be accomplished by comparing gradiometer measurements with predicted gradiometer outputs and combining this with knowledge about the dependence of this difference on total system errors. Additionally, this bounding of the velocity and position errors can be accomplished by comparing an estimated depth obtained from inertial instruments with an estimate from a height (depth) sensor and combining this with knowledge about the dependence of this difference on total system errors.

A navigation system with all errors bounded can be configured using the GAINS concept as a base and augmented by additional information or measurements. An example of GAINS augmentation that does not require any additional instrumentation is the inclusion of gravity map matching into the basic system for bounding east error by gravity field map matching.

EXAMPLE AUGMENTATION, GRAVITY MAP MATCHING WITH GAINS

Figure 6:
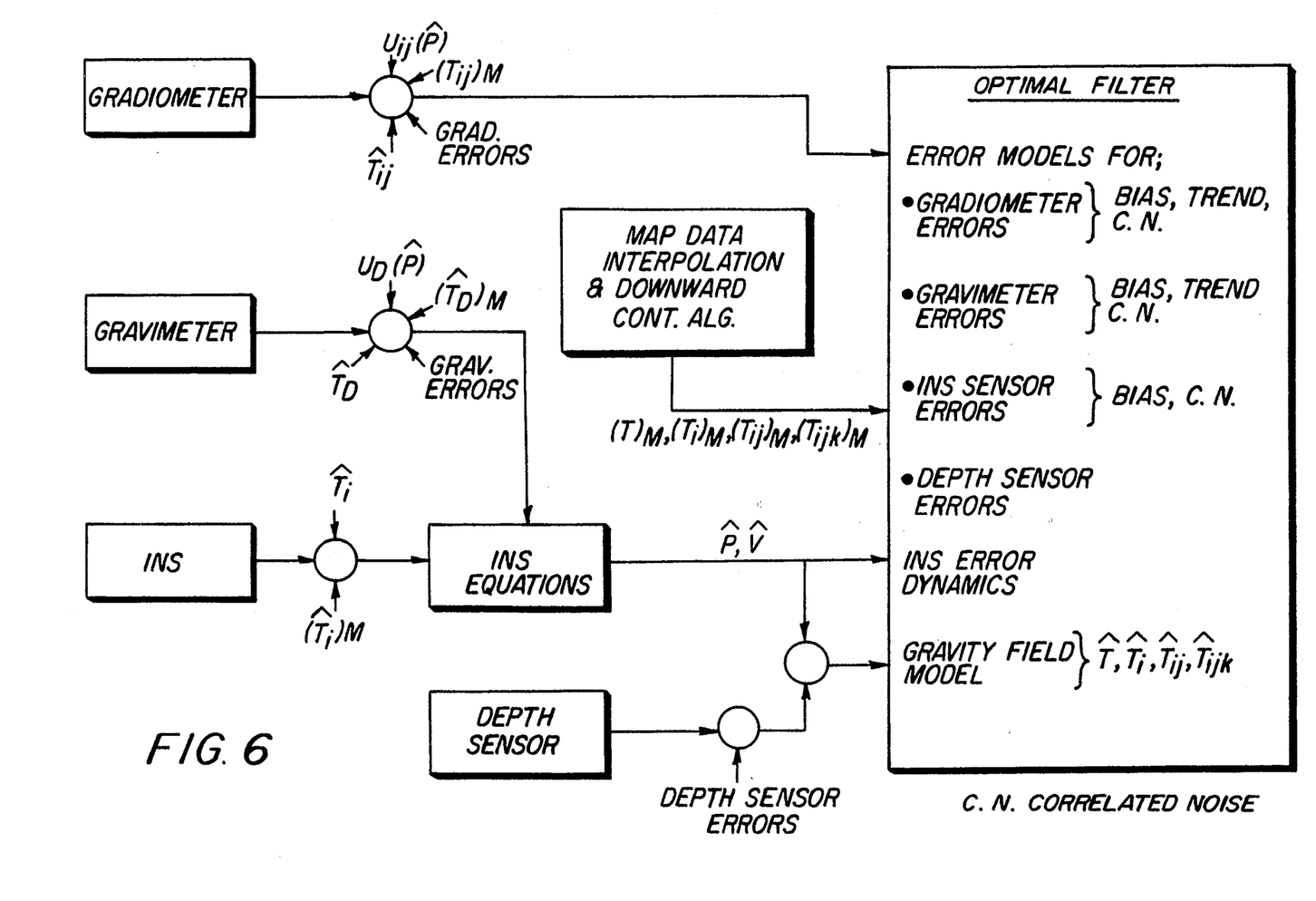
FIG. 6 is a block diagram of a basic Gravity Aided Inertial Navigation System augmented with map matching.

GAINS used with no maps, controls navigation errors very well with only the east position error being unbounded. Consequently the system has excellent gravity map matching performance. FIG. 6 illustrates the GAINS map matching block diagram.

In the following discussion, it is assumed that operationally the map has been preprocessed to provide gridded consistent values of $T$, $T_i$ and $T_{ij}$ at mean sea level with algorithm capability to interpolate and downward/upward continue the map values to the GAINS system location and to also provide ($T_{ijk}$) map data.

In the map matching mode, the GAINS optimal filter carries a Markov gravity model of the map error and not of the full anomalous gravity field. If for example the map used is based an GEOSAT data then the map error model must characterize the higher spatial frequencies not present in the map. The INS accelerometer and gravimeter measurements are now compensated with both map values and map error estimates of disturbance vector components. The gradiometer measurements are likewise compensated with both map and map error gradients.

The optimal filter requires a linearization of navigation errors appearing in the gradiometer innovation. In the NED frame the associated gradient error is given by:

$$\Delta T_{ij} = (T_{ijk})_{Map} \widetilde{P}$$

This gradient (a function of position error $\widetilde{P}$) is resolved into the instrument frame of each gradiometer and the associated in-line and cross gradient contributions are determined.

The GAINS concept combines gradiometer and height sensor data with a three axis INS to produce a totally autonomous and covert navigation system having almost all errors (East position error excepted) accurately bounded. Inclusion of an a priori map bounds all errors. Since a GEOSAT map is available for all the oceans, the system can be run continuously in the map matching mode.

Mission scenarios requiring precise relative navigation (as opposed to absolute navigation) are satisfied by the GAINS system. An example of such a mission would have an AUV enter a poorly mapped area, search for and map mine locations then return to and rendezvous with the deploying submarine. The AUV simultaneously maps the gravity field of the area while establishing mine locations in this map frame. Any other vessel equipped with this map and GAINS can enter the area and position itself accurately with respect to the mapped mine field.

Such mission scenarios and system configurations and operations are presented herein are by way of explanation and in no way to be considered limiting. Furthermore many other embodiments which will readily be apparent to those skilled in the art may be made without departing materially from the spirit and scope of this invention.

What is claimed is:

1. A navigation system, comprising:
   a gravity gradiometer means;
   a three axis inertial position determining means including a vertical accelerometer means;
   a vertical displacement sensor; and
   an optimal filter means for integrating electronic outputs from said gravity gradiometer means, said three axis inertial position determining means and said vertical displacement sensor.

2. A navigation system as defined in claim 1 wherein said gravity gradiometer means measures less than every element of the complete local gravity gradient tensor and produces estimates of the local gravity field.

3. A navigation system as defined in claim 1 wherein said gravity gradiometer means comprises:
   a plurality of accelerometers mounted on a rotatable support mounting means;
   means for rotating said rotatable support mounting means; and
   a housing for said means for rotating and said rotatable support mounting means supported by a stabilized platform.

4. A navigation system as defined in claim 3 wherein said gravity gradiometer means comprises:
   a shake accelerometer oriented along the axis of said rotatable support mounting means and mechanically coupled thereto;
   a shake actuator mechanically coupled to said shake accelerometer; and
   spring bias means for supporting said shake actuator and said shake accelerometer within said housing.

5. A navigation system as defined in claim 3 wherein said plurality of accelerometers comprises four accelerometer.

6. A navigation system as defined in claim 3 wherein said plurality of accelerometers are mounted tangentially and equally spaced apart radially on said rotatable support mounting means.

7. A navigation system as defined in claim 1 wherein said gravity gradiometer means comprises one to three rotating gravity gradiometers.

8. A navigation system as defined in claim 1 adapted to function as a gravity survey system.

9. A navigation system as defined in claim 1 wherein said gravity gradiometer means measures every element of the complete local gravity gradient tensor and produces estimates of the local gravity field.

10. A navigation system, comprising:
a gradiometer means comprising from one to three gradiometers each comprising four rotating accelerometers mounted tangentially at cardinal points on a rotating means;
a three axis inertial position determining means including a gravimeter grade vertical accelerometer;
a depth sensor; and
an optimal filter means for integrating outputs from said gradiometer means; said three axis inertial position determining means and said depth sensor.

* * * * *